United States Patent [19]

Griffiths

[11] Patent Number: 4,885,016

[45] Date of Patent: Dec. 5, 1989

[54] MULTISTAGE FRACTIONAL FREEZING FOR SUPERPURIFYING CRYSTALLIZABLE SUBSTANCES

[76] Inventor: Kenneth F. Griffiths, 415 Whitewater Ave., Fort Atkinson, Wis. 53538

[21] Appl. No.: 238,917

[22] Filed: Aug. 31, 1988

[51] Int. Cl.⁴ .......................... B01D 9/04; C02F 1/22
[52] U.S. Cl. ........................................ 62/532; 62/123
[58] Field of Search .................................. 62/123, 532

[56] References Cited

U.S. PATENT DOCUMENTS

| Re. 32,241 | 9/1986 | Saxer | 62/542 |
| 3,128,188 | 4/1964 | McIntire | 62/532 |
| 3,992,900 | 11/1976 | Campbell | 62/123 |
| 4,143,524 | 3/1979 | Thijssen | 62/123 |
| 4,430,104 | 2/1984 | VanPelt | 62/123 |
| 4,666,456 | 5/1987 | Thijssen et al. | 62/541 |

Primary Examiner—Ronald C. Capossela
Attorney, Agent, or Firm—Lockwood, Alex, FitzGibbon & Cummings

[57] ABSTRACT

A method and apparatus are provided for superpurifying crystallizable substances to a purity level of 99.999 percent. Included is controlling the reflux ratio by controlling and/or metering transfers of crystals and mother liquid at selected locations and by maintaining a steady state of transfers between a plurality of stages that carry out similar operations.

24 Claims, 3 Drawing Sheets

MULTISTAGE FRACTIONAL FREEZING FOR SUPERPURIFYING CRYSTALLIZABLE SUBSTANCES

BACKGROUND AND DESCRIPTION OF THE INVENTION

The present invention generally relates to multistage recrystallization, and more particularly to a multistage recrystallization method and apparatus for superpurifying crystallizable substances to purify them to extremely high levels, typically on the order of 99.999 percent purity. Reflux ratio conditions are controlled closely, referably in association with the establishment and maintenance of steady state conditions in each stage of the system, thereby facilitating generally automatic control of reflux ratio conditions by closely monitoring and metering selected material transfers, inputs and/or outputs for each stage of the system.

Purification of crystallizable materials by way of recrystallization techniques has been known and practiced for many years. Generally speaking, it is extremely difficult to remove trace impurities from crystallizable materials by recrystallization from a saturated solution therefor, or by other techniques including fractional crystallization and fractional freezing procedures. Included are zone-refining procedures which typically would increase product purity by adding recrystallization stages, but this would be done at the expense of the percentage yield of product that is formed at the last or purest recrystallization stage. For example, it is well known to use fractional crystallization in separating radium chloride from barium chloride by a classic separation procedure that utilizes a complicated grid pattern of many dozens of separate evaporation dishes or crystallizers. Under this procedure, the crystal crop of each crystallizer is transferred to the adjacent crystallizer in one direction, while the mother liquor is transferred in the opposite direction. Although increasing concentrations of radium chloride follow movement of the crystal crop from one crystallizer to the next, a very large number of crystallizers are required, and operating costs for this type of system are very high.

Generally speaking, currently available applications for fractional crystallization have recognized the desirability of operating at an optimum reflux ratio while not necessarily effectively providing suitable specifics for implementing this desirable approach.

The multistage recrystallization art includes multi-step recrystallization systems for separating fluid material having two or more different components. For example, U.S. Pat. No. Re. 32,241 describes having a component crystallize on a cooled surface as material containing the component flows thereover. The process can be used to crystallize a component from its melt. In this patent, a liquid of a given stage is used to wash the crystals formed in that stage before those crystals are transferred to the next purer stage. This wash liquid is the material that is in this stage at a time immediately preceding crystallization therefrom. In an embodiment of that patent, the crystals are transferred to the next purer stage as soon as appropriate valves cause the liquid of the next purer stage to contact and dissolve the crystals. The wash liquid, which is used to wash the crystal crop of a given stage, is the purest part of the liquid present in that given stage before any material is crystallized from it.

Publications such as U.S. Pat. No. 4,666,456 describe what are essentially a single stage crystallization systems. This particular patent shows a fractional freezing process which includes continuous partial crystallization of a compound from a liquid mixture in which the mixture is fed through a cascade of a plurality of cooling sections. These cooling sections are connected in series, and the temperature of each subsequent one of the cascading cooling sections is lower than that of the preceding one. A percentage of the mixture freezes out in each stage. Mother liquor is transferred between two adjacent stages.

It has been found that, by proceeding in accordance with the present invention, it is possible to achieve superpurification of crystallizable substances by removal of certain impurities therefrom through a multistage fractional freezing recrystallization procedure that achieves purity levels on the order of 99.999 percent with extremely high yields that are exceptional for multistage recrystallization procedures. Included is an effective manner of controlling reflux ratio conditions while achieving and maintaining steady state operating conditions.

In summary, the present invention is a method and apparatus for superpurifying crystallizable substances by a multistage recrystallization procedure which includes measures to control reflux ratio conditions by providing metering procedures that control quantities of crystals and mother liquor reflux materials that are transferred according to the method and apparatus. In each stage, a crystallizable substance is frozen and recrystallized, and the crystals are separated from the mother liquor. A controlled quantity of the mother liquor is metered. In the least pure stage, this metered mother liquor provides a controlled quantity of byproduct. This metered mother liquor of the other stages is transferred to the crystals that had been separated from the next less pure stage in order to thereby wash same. Crystals collected in the purest stage provide a predetermined quantity of crystal product. A predetermined quantity of crystallizable material is fed to the least pure stage and another cycle is run. If desired, additional, similar stages may be provided in order to concentrate the byproduct so as to form a relatively large percentage of purified material and a smaller percentage of very impure material. This purified material can be used as feed material to the multistage recrystallization system.

It is a general object of the present invention to provide an improved method and apparatus for superpurifying crystallizable substances.

Another object of the present invention is to provide an improved superpurification system that utilizes multistage recrystallization that effectively, efficiently and very closely controls reflux ratio conditions.

Another object of the present invention is to provide an improvement in multistage recrystallization that can achieve and then maintain steady state conditions.

Another object of this invention is to provide improved superpurification of crystallizable substances by generally automatically metering inputs and outputs from the system and between stages of the system which maintain a gradient of differing purity levels.

Another object of this invention is to provide an improved multistage recrystallization system which achieves extremely high purification together with particularly high yields Another object of the present invention is to provide an improved apparatus and method for superpurification of crystallizable substances which includes the use of arrangements whereby a wash reflux from one stage of a multistage recrystallization system is used to displace residual mother liquor from crystals formed in a stage that is immediately adjacent to and that operates a lower purity levels than the stage from which the wash reflux originates.

Another object of the present invention is to provide a multistage recrystallization system wherein especially efficient and thorough separation of a minor ingredient from a major ingredient is effected.

Another object of this invention is to provide an improved apparatus and method that utilizes multiple stages and involves forming a new crystal crop in each stage.

Another object of this invention is to provide an improved multistage fractional crystallization system having a controlled reflux ratio such that the proper reflux ratio can be used to separate a minor ingredient having a given segregation coefficient.

Another object of the present invention is to provide an improved apparatus and method wherein reflux leaving a given stage of a multistage system is as impure as possible and such that the crystal material leaving that stage is as free of its mother liquor as possible in order to thereby maximize the separation efficiency of each stage.

These and other objects, features and advantages of this invention will be clearly understood through a consideration of the following detailed description.

BRIEF DESCRIPTION OF THE DRAWINGS

In the course of this description, reference will be made to the attached drawings, wherein.

DESCRIPTION OF THE PARTICULAR EMBODIMENTS

Figure 1:
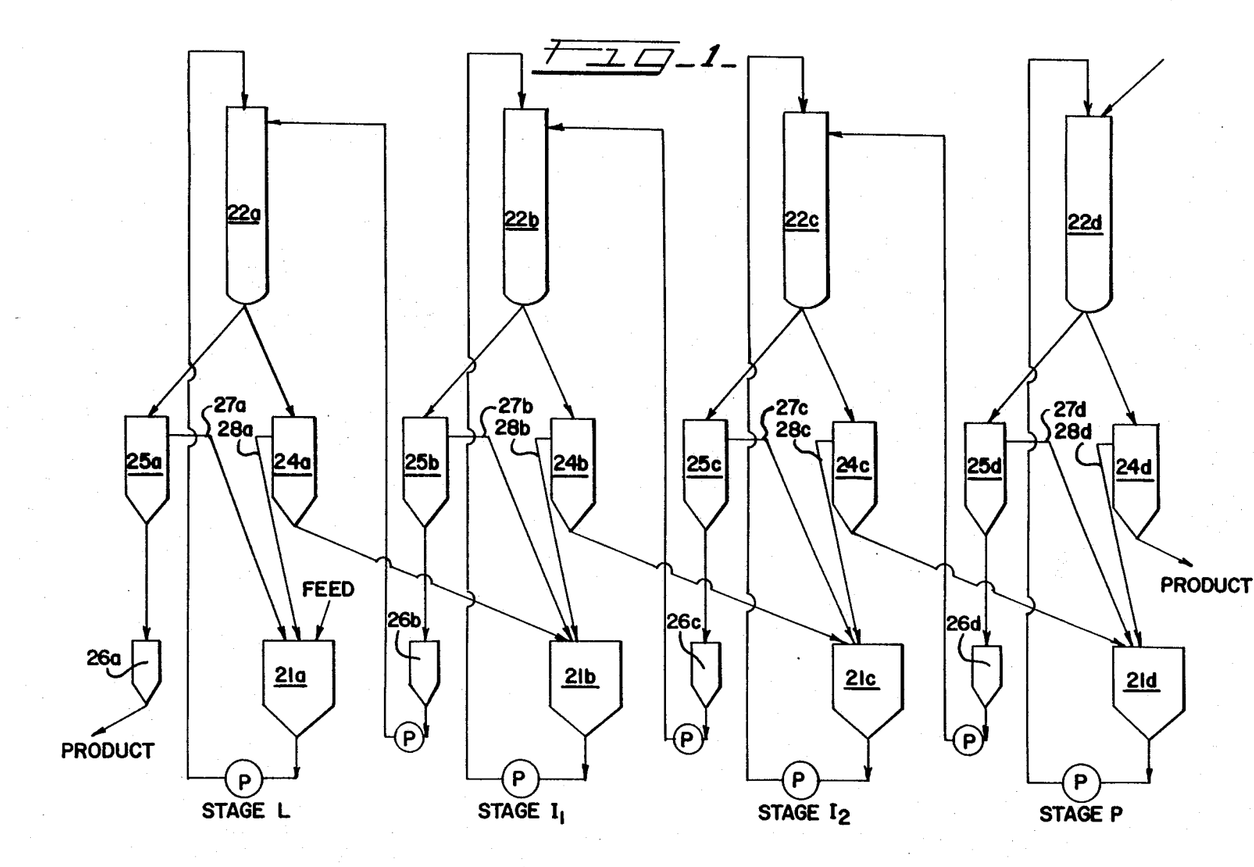
FIG. 1 is a generally schematic view or flow diagram of a multistage superpurification system according to this invention.

In the arrangement illustrated in FIG. 1, a multistage recrystallization system is shown to include four different stages, each of which processes substantially equal quantities of various components, but with different purity levels being maintained from stage to stage. In the illustrated embodiment, Stage L is the stage at which the crystallizable material therewithin is at a purity level that is the lowest among the stages illustrated in FIG. 1. Stage P is the stage at which the purity level is the highest, and Stage I1 and I2 have purities of intermediate degrees, meaning that both are purer than Stage L and less pure than Stage P, while Stage I2 is purer than Stage I1. These intermediate stages can be omitted, or additional intermediate stages can be added without significantly decreasing the yield of the multistage recrystallization system. In a typical situation, a superpurity level of on the order of 99.999 percent purity is attained with on the order of four intermediate stages. If even greater purity, or hyperpurity, is desired, six to eight or more intermediate stages could be utilized, although it must be appreciated that the greater the number of intermediate stages, processing cost and time are increased. Flow rates between these various stages are substantially the same, and the flow rates are developed to ensure that crystals within each cycle are melted and recrystallized.

Each stage includes a collector $21a$, $21b$, $21c$, $21d$. This collector area or feed vessel can also function to melt the crystal materials, although a separate crystal dissolver or heater assembly (not shown) can be provided as desired. The collector vessel is typically a heated vessel in which a charge of mother liquor and crystals may be heated sufficiently to dissolve the crystals to form a new solution. Means such as the illustrated pump, or another suitable type of arrangement, can be used to transfer the new solution from the collector to a processor $22a$, $22b$, $22c$, $22d$ of each stage, wherein crystallization is effected.

The processor of each stage forms a new crystal crop in each stage from molten major ingredient. It has means for freezing a portion of the new solution charged into it, and it has means to drain the mother liquor from a mass of crystals formed in it. Each processor also has means to melt batches of drained crystals contained within it.

A melted crystal receiver $24a$, $24b$, $24c$, $24d$, can be provided for each stage for receiving the melted crystal material from that stage's processor and then transferring at least some of it to the collector of the next purer stage. A suitable mother liquor receiver $25a$, $25b$, $25c$, $25d$ can be provided in each stage for receiving drained mother liquor from that same stage's processor and then transferring at least some of it to the collector of the next less pure stage.

Means are then provided for metering a controlled quantity of the mother liquor from each mother liquor receiver. Such means for this location, or at other locations in the cycle, can take the form of proportioning pumps or the like (not shown) which are timed to convey a controlled volume and/or weight of each material to each stage during the proper time in the cycle. Other suitable assemblies or approaches could be used.

In the arrangement illustrated in FIG. 1, this metering function is accomplished by using a metering reflux receiver $26a$, $26b$, $26c$, $26d$, which may be a vessel suitable to receive and store a measured volume or weight of mother liquor. Each reflux receiver may be used in combination with a suitable arrangement for ensuring that a preselected volume and/or weight of mother liquor is transferred thereto. One arrangement could be to provide a suitable metering device wherein the flow into the metering reflux receiver can be monitored and controlled. Another arrangement could be to provide a liquid level responsive probe within the metering reflux receiver in order to detect when a certain volume of mother liquor is present therewithin. A further approach is to provide an overflow conduit $27a$, $27b$, $27c$, $27d$ wherein excess or residual mother liquor within each mother liquor receiver is removed therefrom so that the controlled quantity of mother liquor can be transferred from the mother liquor receiver $25a$, $25b$, 25c, 25d to the metering reflux wash receiver 26a, 26b, 26c, 26d. One type of overflow conduit may be variable so as to permit adjustment of material to be transferred. Whatever arrangement is utilized, it is typically preferred to incorporate an adjustability function within the metering or controlling means so that the apparatus can be used for achieving different reflux ratios and/or for processing different crystallizable materials.

Means are further provided for transferring the thus metered or controlled volume and/or weight of mother liquor from each reflux wash receiver. In Stage L, this provides byproduct from Stage L, which byproduct can be further processed if desired in an appropriate multistage recrystallization concentration system which can be added upstream of Stage L or which can simply process the byproduct at a later time. Each stage of such a concentration system is similar to those shown in FIG. 1, and are shown in more detail in FIG. 3.

With more particular reference to the collector 21a, 21b, 21c, 21d, each has means for mixing liquids introduced into it during an operating cycle. In some cases, the internal volume of each collector can be equal to the volume of new solution that should be charged to that stage's processor just before the start of the freezing period of each operating cycle. In such an arrangement, the volume of each stage's collector would determine the volume of new solution that would be charged to each processor during each cycle. During each operating cycle, each stage's collector would receive various flows. Included would be the reflux mother liquor from the next purer stage and melted crystal material from the next less pure stage. Each stage's collector can also receive, during each operating cycle, some mother liquor from its own stage's processor and/or some melted crystal material from its own stage's processor.

In the embodiment shown in FIG. 1, crystal material is transferred from each crystal receiver or the like to the collector or its equivalent of the next purer stage. In the case of the crystal receiver 24d, the crystals removed therefrom constitute the superpurified crystal product according to the invention. In a preferred embodiment, the quantity of this product is metered or controlled by suitable means, such as means of the type that are described hereinabove in connection with metering or controlling the mother liquor reflux operation. The drawings illustrate an excess or residual crystal transfer conduit 28a, 28b, 28c, 28d wherein any excess crystals within the crystal receiver can be transferred to the collector or the like of that same stage so that these crystals can be recrystallized and not lost and so that the reflux ratio and steady state conditions of the system are not disrupted. For example, conduit 28a transfers excess crystals from the crystal receiver 24a to the collector 21a, and substantially the same transfer can be practiced in each of the other stages of the system.

Depending upon the particular metering means utilized, transfer of the excess crystals out of the crystal receivers can take lace before or after transfer of the metered amount of crystals. The transfer of the metered weight and/or volume of crystals is to the next purer stage to a location at which these crystals will next be subjected to further recrystallization and further purification. Usually, the crystals are melted before this transfer to the next purer stage. In the embodiment illustrated in FIG. 1, this transfer includes metered movement of crystals from crystal receiver 24a to collector 21b, from crystal receiver 24b to collector 21c and from crystal receiver 24c to collector 21d.

Whatever materials are then present in each collector are combined into the new solution or new melt and transferred to the processor of that same stage in order to thereby effect recrystallization from the new solution of each respective collector. As for the least pure collector 21a, part of its input is the feed of recrystallizable material, which again can be metered as needed in order to maintain the reflux ratio and steady state conditions of the system. The materials then present within the collector 21a are transferred by suitable means such as the illustrated pump to the crystallizer 22a. Similarly, materials within collector 21b are transferred to crystallizer 22b, and so forth for each stage of the system.

Preferably, withdrawal of the mother liquor reflux from the processor or crystallization vessel in which it is formed is conducted after crystallization of a given mass has been completed. This provides the greatest possible difference in purity between the crystals and the withdrawn reflux of any given stage. This maximizes the separation efficiency of each stage.

Figure 2:
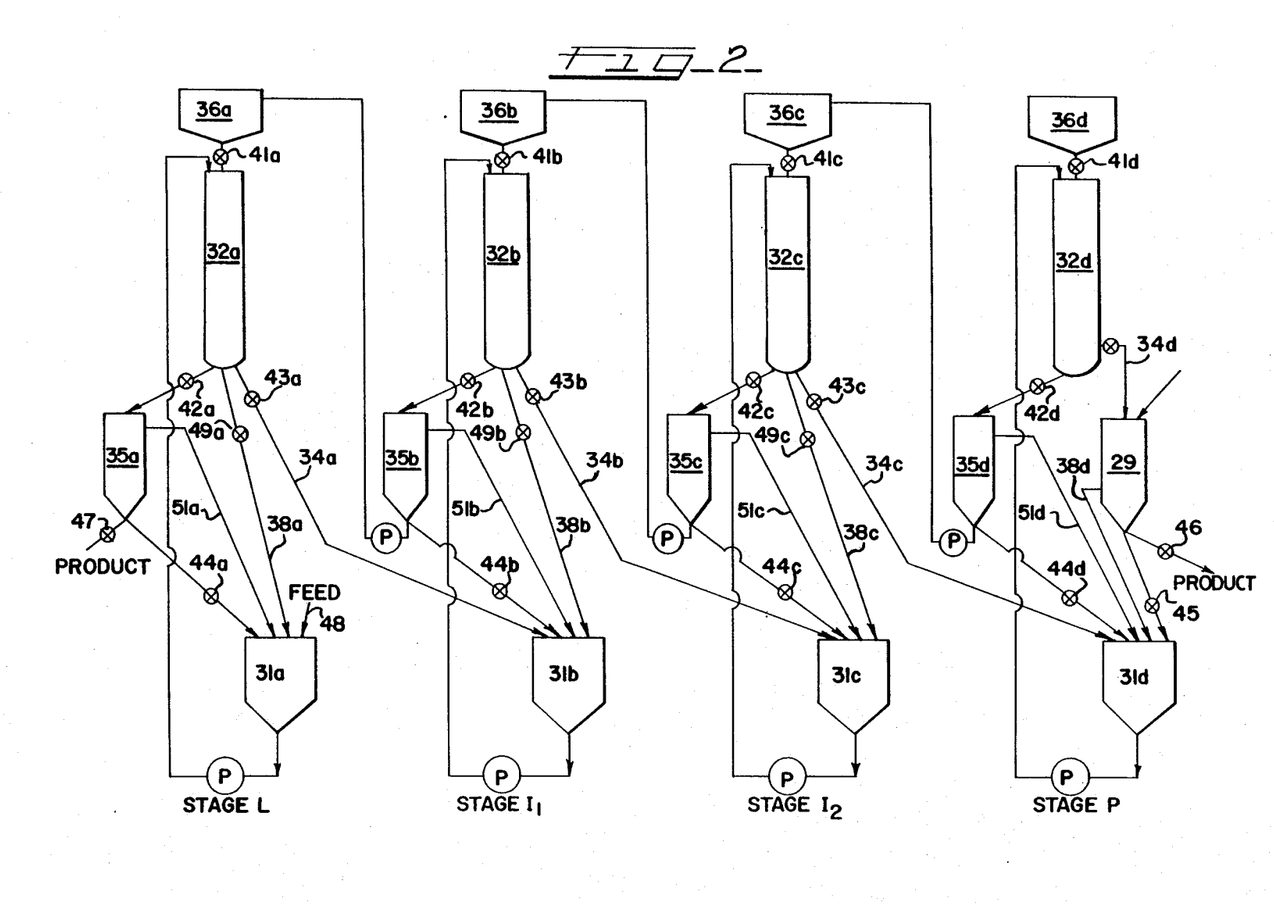
FIG. 2 is a generally schematic view or flow diagram of an alternative embodiment for carrying out the multistage recrystallization superpurification according to the present invention.

FIG. 2 illustrates another embodiment of the invention that specifies other ways of realizing the objectives of the invention. Again, four stages are illustrated, Stage L, Stage I1, Stage I2 and Stage P. Each of these stages has substantially the same attributes as discussed herein with respect to the FIG. 1 embodiment. Each stage includes a collector 31a, 31b, 31c, 31d, and a processor 32a, 32b, 32c, 32d, each of which operates in much the same manner as the similarly designated components of the FIG. 1 embodiment.

Rather than providing a separate crystal receiver of the type illustrated in FIG. 1, the needed quantity of crystals are transferred from the processor of one stage to the collector of the next purer stage through a conduit 34a, 34b, 34c. Such crystal flow can be facilitated by a pump and/or metering device as generally discussed herein and as generally illustrated in FIG. 2. Transfer of these crystals from processor 33a passes to collector 31b, while crystals from processor 32b pass to collector 31c, and crystals from processor 33c pass to collector 31d. In the illustrated embodiment, one crystal receiver 29 is included. Desired product is transferred therefrom through conduit 46.

Excess crystal material from each stage, preferably together with wash material as discussed hereinafter, passes to the collector of that same stage for subsequent recrystallization within the processor of that stage. In Stage L, Stage I1 and Stage I2, this transfer is effected directly from processor 32a, 32b, 32c through conduit 38a, 38b, 38c, and to the collector 31a, 31b, 31c, respectively, of that stage. In Stage P, this transfer is illustrated as being from the crystal receiver 29, through conduit 38d and to collector 31d.

Material within each collector 31a, 31b, 31c, 31d is transferred to the respective processor for each stage, as illustrated. In this embodiment, mother liquor from the mother liquor receiver 35a is transferred as byproduct, whereas mother liquor from receiver 35b, 35c, 35d is transferred to a reflux wash receiver 36a, 36b, 36c, when provided as illustrated.

By this arrangement, the crystals of any given stage are washed with reflux mother liquor that is transferred from the next purer stage. Crystals of a given stage are thus washed before those crystals are melted or transferred to the next purer stage. Crystals of each stage are separated in the processor from their mother liquor by gravitational drainage that is preferably substantially vertical. This removes most, but not all, of the mother liquor from the crystals. The washing operation removes as much as possible of this remaining mother liquor, and the crystals of a given stage provide a purer melt. This is because substantially all of the mother liquor in the crystals is replaced with mother liquor of the next purer stage.

With more particular reference to the operation of the FIG. 2 embodiment, valves 41a, 41b, 41c, 41d or the like can be provided to control the rate of drainage of reflux wash from the reflux wash receiver of each stage and into the processor of that stage. Valves 42a, 42b, 42c, 42d or the like are provided to control the drainage of mother liquor from the processor of each stage to its mother liquor receiver. Valves 43a, 43b, 43c or other suitable metering means as generally previously discussed are provided to permit control of transfer of crystals from the processor of each stage to the collector of the next purer stage or, in the case of metering means 34d, to the crystal receiver 29. Valve or other metering means 44a, 44b, 44c, 44d, can be provided to control drainage of mother liquor from the mother liquor receiver to the collector of that same stage. Means 45 controls transfer of excess crystal material to the collector of the purest stage, and means 46 controls transfer of product out of the multistage system illustrated in FIG. 2. Metering means 47 can be provided for controlling the flow of byproduct out of the system, in this case from the mother liquor receiver 35a. Feed into the system can be through transfer means 48, which opens into the collector 31a in the least pure stage.

Means such as overflow conduits 51a, 51b, 51c, 51d are provided to permit transfer of excess or overflow mother liquor from the mother liquor receiver of each stage and into the collector of that same stage. Overflow conduit 38d can be used to transfer overflow crystals from the crystal receiver 29 to the collector 31d of the purest stage. These overflow means, or other means to perform this function, can be used to determine the volume of holdup to be retained in the mother liquor receiver or crystal receiver by virtue of its level within such receiver.

When an apparatus such as that shown in FIG. 2 is run for the steady production of product and byproduct over a number of identical cycles, it may be operated such that a controlled volume of mother liquor may be transferred from each stage to the next less pure stage as reflux. This reflux is also used as a crystal wash for the crystals in the stage to which the reflux is being transferred. This apparatus may be operated in a series of identical cycles having steps such as those described hereinafter.

Just before the start of the crystallization period, the processor 32a, 32b, 32c, 32d of each stage has been filled with its proper charge of material. Then, the material in each processor is chilled for a duration adequate to cause the desired percentage of material to freeze.

Next, a mother liquor drainage period proceeds. Just before the start of this period, valves 47, 44a, 44b, 44c and 44d are closed. This period is initiated by the opening of valves 42a, 42b, 42c and 42d to permit the mother liquor in each stage's processor to drain into the mother liquor receiver of the same stage. Then, these valves are closed. During this period, each stage's mother liquor receiver 35a, 35b, 35c, 35d fills to the level of overflow conduits 51a, 51b, 51c and 51d, and then all additional mother liquor overflows through that conduit into that same stage's collector 31a, 31b, 31c, 31d. At the end of this period, most of the mother liquor has been drained from the crystals of each stage's processor.

The mother liquor, which is held in the mother liquor receiver 35b, 35c, 35d is pumped into the reflux wash receiver 36a, 36b, 36c of the next less pure stage. Crystal washing may be done at the same time as this reflux transfer step or can be done at a later time. Before the start of this period, valves 42a, 43a, 42b, 43b, 42c and 43c are closed and valves 49a, 49b and 49c are opened. At the start of this period valves 41a, 41b and 41c are opened sufficiently to allow the wash reflux to drain through the crystals at a controlled rate. This rate should be relatively slow so as to permit the wash reflux to percolate through the crystals and displace as much as possible of the original mother liquor. Therefore, at the end of the wash period, any original mother liquor, which was wetting the crystals at the beginning of this period, would be replaced with the reflux from the next purer stage. The wash effluent from the crystals in each stage's processor drains through the open valves 49a, 49b and 49c, respectively, into the collector 31a, 31b, 31c, respectively, of the same stage. In this washing operation, it is preferred that the temperature of the wash reflux be as near as possible to the melting point of the crystals being washed in order to minimize any possible melting of the crystals by the wash.

Any remaining original mother liquor, which still wets the crystals formed in the processor 32d after the completion of the mother liquor drain period, may be washed down into collector 31d by a partial melting of those crystals. Just before this partial melting is started, valves 34d and 45 are opened. At this time valve 46 is closed. Then, an amount of these purest stage crystals are melted to replace the remaining original mother liquor with new melted crystal material. The effluent of this melting and crystal washing operation drains through the crystal receiver 29 and into the collector 31d. This partial melting step is terminated while there are still enough crystals left to make up a normal charge for the purest crystal receiver 29. The volume of this normal charge is the volume in this vessel that is below the overflow conduit 38d or the like. More specifically, this volume is the volume of product that should be discharged through valve 46 during each cycle. At the end of this crystal melting and washing period, valves 34d and 45 are closed.

A crystal melting period proceeds. Before the start of this period, valves 42a, 43a, 42b, 43b, 42c, 42d and 43d are closed. Then, the crystals in each stage's processor are melted, and the resultant melt is retained temporarily in each stage's processor.

Sequential draining of melted crystal material from each stage's processor starts with the purest stage processor 32d and progresses in order to the least pure stage generally as follows. Valve 34d is opened to permit all of the melted crystal material in the processor 32d to drain into the crystal receiver 29. Some of this material overflows through conduit 38d into collector 31d, and valve 34d is then closed. Valve 46 is next opened to drain the crystal product from the bottom of crystal receiver 29 as product of the apparatus. Valve 43c is next opened to permit enough melted crystal material to drain out of processor 32c to complete the filling of the collector 31d of Stage P. Then, valve 49c is opened to permit the remainder of the material in processor 32c to drain into the collector 31c of Stage I2, and valve 43c is then closed. Next, valve 43b is opened to fill collector 31c of Stage I2, and the remainder of the material in processor 32b is drained into collector 31b of Stage I1. Thereafter, valve 43a is opened to fill collector 31b of Stage I1, and the remainder of the material in processor 32a is drained into collector 31a of Stage L. At the end of this period, the collector of Stages I1, I2 and P are completely full and the Stage L collector is only partly filled. A sufficient quantity of feed is introduced into the Stage L collector to fill it completely.

Byproduct is withdrawn any time after the completion of the mother liquor drainage period. The Stage L mother liquor holdup in the Stage L mother liquor receiver 35a may be drained through valve 47 as byproduct of the apparatus. New solution or melt in each stage's collector is transferred to the processor of the same stage by activating the pumps or the like therebetween.

Figure 3:
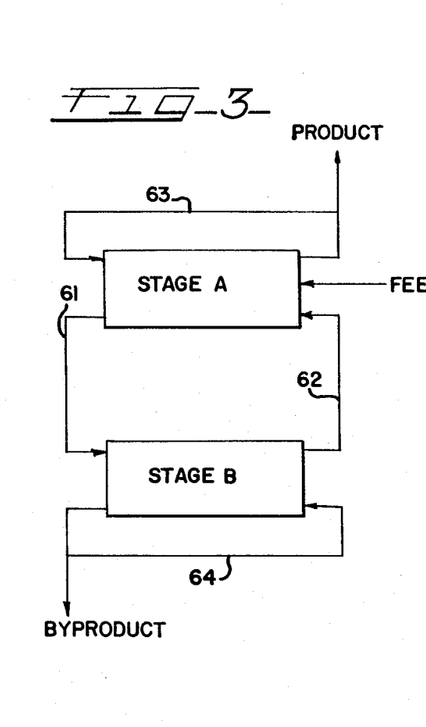
FIG. 3 is a schematic illustration of an embodiment of a multistage impurity concentrating system useful with the invention.

With reference to FIG. 3, an impurity concentration system having two stages is illustrated. Again, additional stages can be added as desired. Details of the components of each stage are generally in accordance with that shown in FIG. 1, FIG. 2, or equivalents thereof. Generally speaking, the impurity concentrating section can be provided for the purpose of concentrating the impurities in the byproduct from Stage L into a small portion of very impure new byproduct and a larger portion of purified material which is suitable for providing some of the feed to Stage L. This typically improves the yield of the total system, particularly where the product from the impurity concentrating section is returned to Stage L as feed material. This can be facilitated by having the product from the impurity concentrating section be of a purity substantially the same as the crystallizable material feed to Stage L. Generally speaking, the byproduct of the impurity concentrating section would constitute a small volume percentage of the feed thereto and would have a much higher concentration of impurities than its feed material, which is the byproduct from Stage L.

One difference between the operation of the impurity concentration system and a primary system of the type illustrated in FIGS. 1 and 2 is that the feed into the impurity concentrating system is to its stage that operates at its higher or highest purity, which is Stage A as illustrated in FIG. 3.

Stage B, the stage that operates with the lesser or least purity of materials, communicates with Stage A in substantially the same manner as adjacent stages in FIG. 1, FIG. 2 or the like. Mother liquor is transferred from purer Stage A to less pure Stage B through transfer means 61. Crystal material from Stage B moves to Stage A through transfer means 62. A desired quantity of product exits Stage A, while recycle crystal material re-enters Stage A via transfer means 63. A desired quantity of byproduct is removed from Stage B, while mother liquor recycle is carried out by way of a transfer means 64.

With more particular reference to the various controlling and/or metering functions and means that are discussed in conjunction with the various stages and transfers between them, the following controlling and-/or metering aspects are preferred. During each cycle, substantially the same volume of reflux mother liquor should be transferred from each stage to the next less pure stage. During each cycle, substantially the same volume of recrystallized crystal material should be transferred from each stage to the next purer stage. During each cycle, a controlled volume of recrystallized crystal material should be discharged from the purest stage as product of the refining system. During each cycle, a controlled volume of mother liquor should be discharged from the least pure stage as byproduct from the refining system. During each cycle, a volume of feed material that is substantially the same as the sum of the volumes of the product and byproduct passed out of the system should be introduced into the least pure stage of the primary system and/or into the purer or purest stage of the impurity concentrating system.

During each cycle, a sufficient amount of material, and typically an amount somewhat in excess thereof, must be recrystallized in order to provide at least enough crystal material to enable the proper volume of this material to be transferred from every stage to the next purer stage during each operating cycle. During each cycle, conditions within the processor, including crystallization time, should be limited or otherwise controlled such that a sufficient volume of mother liquor remains in each processor to enable the proper volume of mother liquor reflux to be transferred from each stage to the next less pure stage during each operating cycle.

The reflux ratio of a given section is the ratio of the weight per cycle of reflux (which is discharged from each stage of the system, monitored for example at the purest stage) to the weight per cycle of crystal product discharged from this same stage. The reflux ratio of the impurity concentrating system can be different from that of the primary recrystallization system, and the duration of each cycle for each of these systems may also be different. The reflux ratio can be controlled by regulating the volume of product removed from the system per cycle and the volume of reflux transferred from stage to stage. The percentage yield of superpure product that is recovered from the crystallizable material fed to the system is controlled by regulating the volume per cycle of product and of byproduct removed from the refining system. Generally speaking, the higher the reflux ratio (e.g. 1:1), the greater is the difference in purity per stage from one stage to the next purer stage, and the lower the reflux ratio (e.g. 0.5:1), the greater amount of product is produced each cycle.

With more particular reference to controlling the reflux ratio, this may be accomplished by controlling the weight of reflux that is transferred per unit of time from each stage to the next less pure stage, and by controlling the weight of crystal product from each stage which is transferred per unit of time from each stage to the next purer stage. In addition, the weight of crystal product which is produced per unit time can be indirectly controlled by controlling the weight per unit of time of crystals entering the purest stage and of reflux leaving that stage per unit time, with the difference between these entering crystals and the leaving reflux being the weight of crystal product. More specifically, two major factors hich determine the reflux ratio of a system are controlled. These factors are the net weight of crystal product produced per cycle by the purest stage and the weight of mother liquor reflux transferred per cycle from this same stage to the next less pure stage. By an indirect metering approach, the operator may meter the correct weight of reflux by withdrawing the proper volume of mother liquor to be used as reflux.

Maintenance of a desirable steady state condition throughout the system is important. When this steady state condition is achieved, the system exhibits the following characteristics. The same weight of crystallizable material to be purified (or the major ingredient) is present in the processor of each stage while crystallization is occurring. The same weight is present in the processor of each stage during the crystallization period of each cycle. Each stage produces the same weight of crystal product during each cycle, which weight would be substantially the same as that of the feed introduced to the system. The same weight of product crystals are produced during each cycle. The same weight of byproduct is produced during each cycle. The weight of product per cycle is substantially the same as the weight of feed introduced per cycle minus the weight of byproduct produced per cycle. Each cycle has substantially the same reflux ratio.

When steady state conditions are achieved and maintained according to the present invention, including adding the same weight of feed during each cycle of this system, the weight of crystals produced in each stage will be the same per cycle as the weight of feed introduced to the least pure stage during each cycle. Also, when steady state conditions such as these are maintained, the reflux ratio of the system will remain substantially the same during a series of cycles in a run.

A sufficient quantity of mother liquor holdup should be maintained in each stage in order to permit the production of an adequate weight of crystals per cycle in each stage. This needed weight is at least equal to or greater than the weight of feed introduced during each cycle.

When controlling the reflux ratio according to the present invention, it is necessary to control both the weight of product per cycle as well as the amount of reflux transferred. Regarding regulating the weight of crystal product, three controllable variables can be considered. These are: feed introduced during each cycle, byproduct discharged during each cycle, and crystal product discharged during each cycle. By introducing the same weight and/or volume of material to each stage's processors at the start of the crystallization period, control of any two of these variables will automatically regulate the third one. In all situations, the weight and/or volume of feed introduced per cycle is substantially equal to the sum of the weights and/or volumes of the product and byproduct discharged per cycle. In addition, the reflux transfer can be maintained by metering the mother liquor reflux that is transferred from each stage to the next less pure stage or by metering the recrystallized crystal material that is transferred from each stage to the next purer stage.

Accordingly, control of reflux ratio conditions can be accomplished according to the present invention by metering three different transfers. In a first case, the crystallizable material feed, the mother liquor byproduct and the mother liquor reflux are each metered. In a second case, the recrystallized product, the feed, and the reflux are metered. In a third case, the product, the byproduct and the reflux are metered. In a fourth case, the feed, the byproduct and the crystal material that is transferred from one stage to another are each metered. In a fifth case, the product, the feed and the crystal material transfer are each metered. In the sixth case, the product, the byproduct and the crystal material transfer are each metered.

Preferably, substantially the same quantity of major ingredient is in each stage's processor during the freezing period of each cycle. Therefore, it is preferred that the volume of feed introduced into the refining system during each cycle is equal to the volume of product and byproduct leaving the system during each cycle. These preferred conditions can be maintained by utilizing any one of the following procedures.

The volume of product and of byproduct withdrawn per cycle from the system are metered, and a sufficient volume of feed is allowed to enter the feed stage to fill that stage's collector to its proper volume just before the freezing period of each cycle. This latter function can be accomplished by, for example, completely filling the collector which is designed to provide the needed fill volume. By another approach, the volume of product leaving the system per cycle and the volume of feed entering the system per cycle are metered, and the volume of byproduct is allowed to equal the overflow volume of excess mother liquor from the least pure stage just before the freezing period of each cycle. In this case, this byproduct volume is the difference between the metered product leaving and product entering volumes. In another approach, the volume of feed entering the system per cycle and the volume of byproduct leaving the system per cycle are metered, and the volume of product is allowed to equal the overflow volume of product from the purest stage just before the freezing period of each cycle. In this case, this product volume is equal to the difference between the metered feed entering and byproduct leaving volumes.

By the multistage fractional freezing process according to this invention, a controlled reflux ratio can be maintained in the refining system even though there may be variations in the weight of material that would freeze in each stage's processor during a given cycle. This is important because typically there are variations in freezing from processor to processor and from stage to stage. For example, the temperature of the incoming material may be slightly different and may freeze and/or crystallize more readily at some times than at others. The present process automatically allows for these variations so that the desired reflux ratio is maintained. A controlled or metered amount of melted crystal material is transferred during each cycle of each stage, rather than, for example, simply transferring all melt within a given processor during a given cycle.

As previously mentioned, control of the reflux ratio can be accomplished by controlling both the weight of mother liquor reflux that is transferred per cycle between adjacent stages in the section and the weight of product discharged per cycle. These controlling methods are now described in greater detail, with the system being operated such that the same weight of major ingredient is present in each stage's processor during the freezing period of each cycle.

Flow of reflux per cycle between adjacent stages may be controlled by directly metering the volume of mother liquor reflux which is transferred during each cycle from any given stage to the next less pure stage. Preferably, substantially the same volume of reflux should be transferred during each cycle from each stage to the next less pure stage. In some cases, the volume of reflux transferred from any given stage equals the volume of mother liquor produced in that stage during a given cycle. When this procedure is used, a very accurate control of the weight of material that freezes in each stage's processor during each cycle is needed. Otherwise, there would be too large a variation in the volume of reflux that would be transferred in different portions of the system. On the other hand, if a very accurate control of the weight of reflux would be required, then the same volume of reflux could be metered from each stage to the next less pure stage as reflux during each cycle. This metered volume may preferably be less than the lowest volume of mother liquor left in any processor after the freezing period of any cycle. However, if an arbitrary volume of mother liquor reflux would have to be transferred from stage to stage in order to maintain the required reflux ratio, than the duration of the freezing period of each cycle would have to be limited such that this mother liquor remains in each processor during each stage. When the reflux is metered, then any untransferred mother liquor left over in any stage is transferred to the collector of that stage.

Metering the volume of melted crystal material transferred during each cycle from each stage to the next purer stage can be combined with metering a controlled volume per cycle of melted crystal material from the purest stage as product. When this metering combination is practiced, the flow of reflux per cycle from stage to stage is automatically the difference between the flow of transferred crystal material to purer stages and the flow of product per cycle. In some cases, all of the melted crystal material produced in each processor during a cycle is transferred to the collector of the next purer stage. In these cases it would be highly desirable to freeze the same weight of material in every processor during each cycle.

However, if a very accurate control of the weight of transferred melted crystal material were required, the same volume of melted crystal material could be metered from each stage for the next purer stage during each cycle. Preferably, in that case, this volume equals the lowest volume of melted crystal material that is produced in any stage's processor during any cycle. If an arbitrary volume of melted crystal material would have to be transferred from stage to stage in order to maintain a required reflux ratio for the system, then the duration of the freezing period of each cycle should be just sufficient to provide at least this much frozen material in each processor during the freezing period. When the transfer of melted crystal material between adjacent stages is metered, any untransferred crystal material left over in any stage is transferred to the collector of that same stage.

As previously stated, control of reflux ratio conditions can be accomplished according to the present invention by six different ways of metering any two of the feed, the byproduct and the product and either the mother liquor reflux to the next less pure stage or the melted crystal material which is transferred from each stage to the next purer stage. A description of the steps in each cycle for each of these cases is now provided.

In the first case, the feed, byproduct and reflux are metered. First, the crystallization period is carried out in the processor of each stage. Mother liquor is drained from the crystals of each stage into the mother liquor receiver of the same stage.

Crystal melting takes place in each stage's processor. A controlled volume of reflux is transferred from each stage to the next less pure stage. If, after this transfer, any mother liquor is left in the mother liquor receiver of any stage, it is then transferred to the collector of that same stage. However, the mother liquor in the mother liquor receiver of the feed stage is retained there during this transfer period. Metered byproduct withdrawal follows. A controlled volume of mother liquor is withdrawn as byproduct from the mother liquor receiver of the least pure stage. Then, the balance of the mother liquor in the least pure stage's mother liquor receiver is drained into the collector of that same stage. Typically, all of the mother liquor receivers will then be empty. A controlled volume of feed is then metered into the collector of the least pure stage.

Next, melted crystal material from each stage's processor is sequentially drained from the least pure stage and from each additional stage to the purest stage. At first, enough melted crystal material is drained out of the least pure stage's processor to complete the filling of that stage's collector. Then, the balance of the melted crystal material, which is still in that stage's processor, is transferred to the controller of the next purer stage. This procedure is continued with the processor of each progressively purer stage until the processor of the purest stage is ready to be drained. The last step in this period is the completion of the filling of the collector of the purest stage with melted crystal material from the processor of that same stage. When this stage's collector is filled, the processor of this stage still has some melted crystal material in it.

Product is then withdrawn from the processor of the purest stage. The volume of this product is equal to the volume of left over melted crystal material after enough of that same material from this processor has been used to complete the filling of the collector of the purest stage. The volume of this product, which is discharged, is very close to the difference in the volumes of the feed introduced and the byproduct withdrawn in this cycle. Finally, the content of each stage's collector is transferred to the processor of the same stage.

In the second case, the feed, product and reflux are metered. It is similar to the first case, except product, rather than byproduct, withdrawal is metered. A controlled volume of melted crystal product is withdrawn from the processor of the purest stage, and then the balance of the material in that processor is transferred to the collector of that same stage. Also, the sequential draining of the melted crystal material from each stage's processor starts with that of the second purest stage and works through each progressively less pure stage. At first, enough melted crystal material is drained out of the second purest stage's processor to complete the filling of the collector of the purest stage. Then, the balance of the material in that processor is transferred to the collector of that same stage. This same procedure is conducted for the processor of each progressively less pure stage until the processor of the feed or least pure stage is empty. At this time, the collector of every stage, except that of the feed stage, is completely full.

Byproduct is then withdrawn from the mother liquor receiver of the feed stage. This has two consecutive steps. The first of these is the introduction of a controlled volume of feed to the feed stage collector, and the second of these is the completion of the filling of the feed stage collector with mother liquor from the feed stage mother liquor receiver. After this step, whatever, mother liquor that is left over in this mother liquor receiver is discharged as byproduct. In this case, the volume of this byproduct is very close to the difference in the volumes of the feed introduced and the product discharged in this cycle. Finally, the content of each stage's collector is transferred to the processor of the same stage.

In the third possible case sequence for controlling the reflux ratio, the product, byproduct and reflux are metered. It is similar to the first case through the steps of metered byproduct withdrawal and emptying of the mother liquor receivers. Metered product withdrawal and sequential draining of the melted crystal material from each stage's processor is in accordance with the second case. Next, feed is input into the collector of the feed or least pure stage until it is filled completely. In this case, the volume of the introduced feed material is very close to the sum of the volumes of product and byproduct metered out of the system during this cycle. As in the other cases, the content of each stage's collector is transferred to the processor of the same stage.

In the fourth possible case, feed, byproduct and crystal material transfer are metered. First, the crystallization period is carried out in the processor of each stage. Mother liquor is drained from the crystals of each stage into the mother liquor receiver of the same stage, and crystal melting takes place in each processor. A controlled volume of melted crystal material is transferred from each stage to the collector of the next purer stage. If, after this transfer, any untransferred melted crystal material is left in any stage, it is then transferred to the collector of that same stage. However, the melted crystal material in the processor of the purest stage is retained there during this transfer period. Then a controlled volume of feed is metered into the collector of the feed stage. Byproduct withdrawal proceeds by withdrawing a controlled volume of mother liquor from the least pure mother liquor receiver.

Sequential draining of the mother liquor from each stage's mother liquor receiver starting with that of the least pure stage and working upward to that of progressively purer stages is carried out. The first step in this period is draining into the least pure collector the balance of the mother liquor which was left in the least pure stage's mother liquor receiver after the byproduct withdrawal. Then, a sufficient quantity of mother liquor is transferred from the next purer (Stage I1) mother liquor receiver to fill the least pure stage's collector completely; and, the balance of the mother liquor which is still in the Stage I1 mother liquor receiver is transferred to the collector of that stage.

In this same manner, the mother liquor is drained out the receivers of each progressively purer stage until a selected volume of mother liquor has been drained out of the mother liquor receiver of the purest stage. Thereafter, all of the collectors except that of the purest stage are completely filled. Next, melted crystal material from the processor of the purest stage is drained in two steps. First, enough of this melted crystal material is transferred to completely fill the collector of the purest stage. Then, the balance of the melted crystal material still in the processor is discharged as product. At the conclusion of this step, all of the stage's collectors are completely full. Thereafter, the content of each stage's collector is transferred to the processor of that same stage.

The fifth manner of controlling reflux ratio conditions meters feed, product and crystal material transfer. The procedure is similar to the fourth case except, rather than a controlled metering out of byproduct, a controlled volume of melted crystal material is metered out of the purest stage as product, and the remainder is transferred to the collector of that same stage. Also carried out is sequential drainage of the mother liquor from each stage's mother liquor receiver starting with that of the purest stage and working downward to that of each progressively less pure stage. The first step in this sequential drainage is to fill completely the collector of the purest stage from the mother liquor receiver of that stage. Any leftover mother liquor in the purest stage's mother liquor receiver is transferred to the collector of the second purest stage (Stage I2). Then, the collector of this stage is completely filled from the mother liquor receiver of that same stage. Thereafter, the leftover mother liquor in that receiver is transferred to the collector of the next less pure stage. This same procedure is repeated for each stage's mother liquor receiver until the remainder of the mother liquor in the least pure stage mother liquor receiver is removed therefrom as byproduct. At the end of this period, all of the stage's collectors are completely filled for transfer to the processor of that stage.

In the sixth approach to control reflux ratio conditions, product, byproduct and crystal material transfer are metered. The procedure of the fifth case is followed through transfer of a controlled volume of melted crystal material out of the purest stage as product. Thereafter, a controlled volume of mother liquor is metered out of the least pure mother liquor receiver as byproduct, and the balance is transferred to the collector of the least pure stage. The sequential drainage of mother liquor from each stage's mother liquor receiver is carried out generally in accordance with the fifth procedure. Thereafter, a sufficient volume of feed is introduced to the collector of the least pure stage to fill it completely, and the content of each stage's collector is transferred to the processor of that same stage.

The procedure and apparatus according to the present invention are suitable for superpurification of various crystallizable materials, which are typically organic substances that often are processed with operating temperatures that are below room temperature. Exemplary recrystallizable materials in this regard include acetonitrile, benzene, benzoic acid, carbon disulfide, chloroform, cyclohexane, dimethyl formamide, dimethyl pyrrolidone, glacial acetic acid, guanidine hydrochloride, n-hexane, naphthalene, nitrobenzene, phenol, pyridine, sodium pentasulfonic acid, tetrahydrofuran, urea, and the like. The following examples illustrate some specific procedures suitable for these types of materials.

EXAMPLE 1

An impurity stripping system of the type generally illustrated in FIG. 1 was run generally in accordance with the sixth procedure described herein in order to superpurify acetonitrile. The operator of this system could maintain or change the reflux ratio, depending upon the particular objectives of each cycle. The operator also could change the percentage of feed that was converted to product.

Each processor was a vertically mounted, tubular container which served to freeze liquid acetonitrile to its interior wall surface during the freezing period of each cycle, served to separate the mother liquor from the frozen acetonitrile by gravitational drainage during the mother liquor drainage period of each cycle, and also served to melt the separated frozen acetonitrile from its walls during the melting period of each cycle.

Each melted crystal receiver had means to store a controlled volume of melted crystal material and allow any excess to overflow to the collector of its same stage, as well as the other distribution means illustrated in FIG. 1. The volume of each stage's collector was equal to the volume of a full normal charge for the processor of that same stage. A timing mechanism was included that was suitable for controlling the operation of the valves and regulate the gravitational flow of acetonitrile in the refining system.

First, initial calibration or startup cycles were run. Before the start of the first cycle of the calibration operation, 40 liters of crude acetonitrile were placed in each collector to fill them completely. The system was then run for six cycles at a reflux ratio of 1 to 0 in order to achieve a normal operating distribution of impurities in the system before the purification operation was initiated. Thereafter, the reflux ratio was changed to 0.625 to 1 for each cycle.

During the startup of 1 to 0 reflux ratio cycles, the 40 liters of acetonitrile were transferred to each processor. The refrigeration coil of each stage's processor then chilled the freezing zone of the walls to approximately −60°C. This period lasted approximately 4 hours and was carefully timed to freeze at least 45 percent and no more than 55 percent of the acetonitrile in each stage's processor. At the end of the freezing period, the frozen portion of the acetonitrile was in the form of a cylinder adhering to the internal diameter surface of the chilled portion of each processor. Also, there was a core of liquid mother liquor along the entire central axis. Then, as much as possible of the mother liquor was drained from the crystals in each stage's processor. Just before the start of this period, the refrigeration was turned off and the mother liquor of each stage's processor was permitted to drain out into the mother liquor receiver of that same stage. For about one hour, the heating means for each processor was turned on and left on until all of the solid acetonitrile in each processor had melted. At the end of this melting period, the melted acetonitrile was near −25°C. The melted acetonitrile of each stage's processor was permitted to flow into the melted crystal receiver of the same stage.

Figure 4:
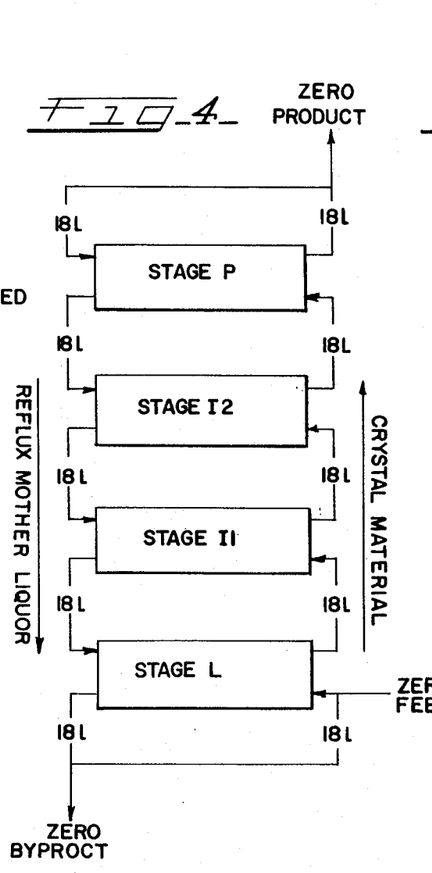
FIG. 4 is a schematic illustration of a system according to this invention which is operating at a calibration reflux ratio of 1 to 0.

As generally shown in FIG. 4, excess melted crystal material was then drained into the collector of the same stage such that 18 liters of melted crystal material was retained in each receiver, except the receiver of the purest stage. All of the melted crystal material from the processor of the purest stage was passed to the melted crystal receiver of that stage. A small overage of melted crystal material (from zero to four liters) overflowed from the melted crystal receiver of each of the other stages to the collector of the same stage. Thereafter, the 18 liters of melted crystal material in the crystal receiver of all but the purest stage was transferred to the collector of the next purer stage, while all of the melted crystal material in the purest stage melted crystal receiver flowed into the collector of that stage.

Mother liquor sequential drainage from the mother liquor receiver of each stage was effected by a series of steps. Mother liquor from the mother liquor receiver of the purest stage was passed into the collector of that stage in order to completely fill it, and the remainder of the contents of this mother liquor receiver was passed to the collector of the next purer stage. Then, in order of reduced purity, each collector was completely filled by flowing mother liquor thereinto from the mother liquor receiver of the same stage, while the balance of the mother liquor in each mother liquor receiver was drained into the collector of the next less pure stage. When this was completed, all of the stage's collectors were completely full, and the respective contents thereof were transferred to the processor of the same stage.

Figure 5:
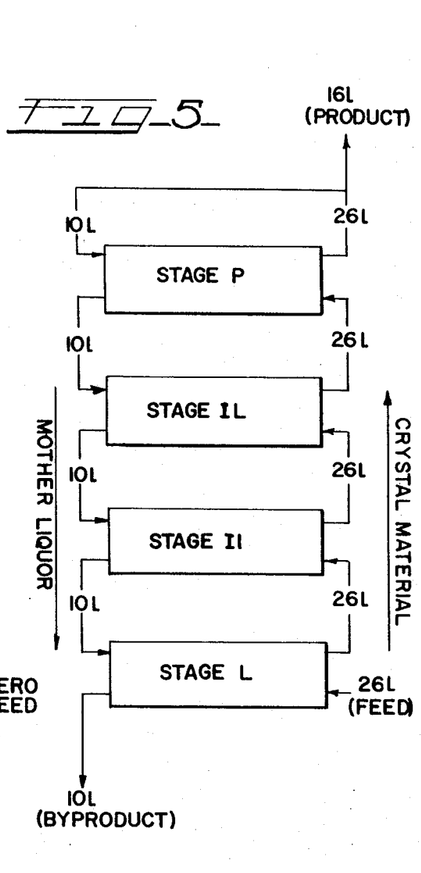
FIG. 5 is a schematic illustration of the system of FIG. 4 which is operating at a processing reflux ratio of 0.625 to 1.

This procedure was run through six consecutive calibration cycles. For all cycles thereafter, the reflux ratio was modified to what had been determined to be an advantageous reflux ratio of 0.625 to 1. These cycles are generally illustrated in FIG. 5.

Just before the start of the seventh cycle, the change in the reflux ratio was effected by the following modifications. The overflow path from each of the Stage L, I1 and I2 crystal receivers was modified such that 26 liters, rather than the 18 liters of the calibration mode, remained therein after passage of overflow out of each receiver. The single overflow conduit of the purest stage crystal receiver was placed in operation so that the volume of melted crystal material holdup in the purest stage melted crystal receiver was 16 liters, rather than the zero liter holdup of the calibration cycles. The length of time for the freezing cycle was 6 hours in order that the percentage of acetonitrile that was frozen in each processor was 70 percent plus or minus about 5 percent. At the end of each cycle's freezing period, there was at least enough frozen acetonitrile in each processor to yield at least 26 liters of melted acetonitrile material. Also, the percentage of frozen acetonitrile in each processor was limited such that there were at least 12 liters of mother liquor in each at the end of each freezing period.

At the conclusion of the reflux transfer operation, collector 21a had approximately 26 liters of empty capacity. Approximately 26 liters of feed were added per cycle so that the least pure stage collector was completely filled. All of the 16 liters of holdup in the melted crystal receiver of the purest stage were discharged as product during each cycle's melted crystal transfer period. The holdup in the mother liquor receiver of the least pure stage was 10 liters at the end of each cycle's mother liquor transfer operation, and this was discharged as metered byproduct.

This example illustrates a preferred method of operation that controls the reflux ratio very accurately even though there may be some difference in the weight of crystals formed in each processor during the various cycles of the illustrated run. Product is produced with the least amount of freezing required per unit of product that is purified.

This example illustrates the use of a procedure that indirectly measured accurately the volume of mother liquor reflux that was transferred from each stage to the next less pure stage during each operating cycle. Control of the volume of reflux transferred was effected by the difference between the volume of melted crystal transferred in the opposite direction and the volume of each stage's collector. In this case, the volume of the transferred melted crystal material between adjacent stages was 26 liters per cycle, and the volume of each stage's mixer was 40 liters. Therefore, by difference, the volume of the reflux which was transferred between adjacent stages was 40 liters minus 26 liters, or 14 liters. Accurate measurement of the volume of melted crystal product was also accomplished. Control of these two volumes for each cycle controlled the reflux ratio.

This example, furthermore, illustrates controlling the amount of material that freezes in each stage's processor. Such controlling ensured that enough material had frozen in each stage's processor during each cycle of a run so as to permit the filling of each stage's crystal receiver to its required minimum volume during each cycle. More specifically, there was a sufficient quantity of melted crystal material from each stage's processor to fill that stage's crystal receiver to the level of the overflow conduit employed. Such controlling also ensured that the freezing period of each cycle of a run was limited sufficiently such that there was enough mother liquor left in each stage's processor at the end of that period to fill each stage's mother liquor receiver with a sufficient volume to provide the required volume of mother liquor reflux for each cycle of the run.

Having maintained the holdup volume of the crystal receiver of Stages L, I1 and I2 the same in this example ensured that the same volume of melted crystal material was transferred from each of these stages to the next purer stage during each cycle in a given run. Also, indirectly, this procedure ensured that the same volume of reflux was moved from Stages I1, I2 and P to the next less pure stage during each cycle in a given run.

EXAMPLE 2

An impurity concentrating system of the type generally illustrated in FIG. 3 was run. This system was used to process 10 liters per cycle of the acetonitrile byproduct solution produced according to Example 1. In each cycle, this impurity concentrating system recovered 8 liters as a crystal product having substantially the same purity as the feed material into the Example 1 system. The remaining 2 liters was converted to a very impure byproduct that contained substantially all of the impurities that were in the feed material.

The operating cycle of Stage A and Stage B was conducted at the same time. In each operating cycle, 18 liters of mother liquor were transferred from Stage A to Stage B, 18 liters of mother liquor were transferred out of Stage B, with 2 liters being byproduct and 16 liters being in Stage B. 16 liters of crystal material were transferred from Stage B to Stage A. Of 26 liters of crystal material of Stage A, 18 liters were refluxed, and the other 8 liters constituted the product.

It will be understood that the embodiments of the present invention which have been described are illustrative of some of the applications of the principles of the present invention. Numerous modifications may made by those skilled in the art without departing from the true spirit and scope of the invention.

I claim:

1. A method for superpurifying crystallizable substances by a multistage recrystallization fractional freezing procedure which includes controlling reflux ratio conditions, the method comprising:

combining a crystallizable substance with a mother liquor thereof to form a new solution, said combining step occurring within a plurality of collectors of a plurality of respective stages, one of which is a collector of a least pure stage and another of which is a collector of a purest stage;

lowering the temperature of the new solution of each said stages to a freezing temperature at which the crystallizable substance crystallizes in order to form frozen crystals with mother liquor in each said stage;

separating said mother liquor from the frozen crystals of each said stage, the mother liquor being in a mother liquor receiver of each said stage;

transferring a controlled quantity of said mother liquor of each stage, said transferring of the controllable quantity of mother liquor from the least pure stage provides a controlled quantity of byproduct, and said transferring of the controllable quantity of mother liquor from the stages other than said least pure stage is for said step of combining to form the new solution of each said stage;

melting at least a portion of said frozen crystals to form a quantity of melted crystals;

transferring a controlled quantity of said melted crystals of each stage, except for the purest stage, to the collector of the next more pure stage for subsequent processing in said combining step of each said next more pure stage;

collecting the separated crystals of the purest stage as a controlled quantity of superpurified crystal product;

adding a controlled quantity of crystallizable substance as feed to the collector of the least pure stage; and controlling the reflux ratio of the multistage recrystallization fractional freezing procedure.

2. The method according to claim 1, further including washing the frozen crystals of each stage, except for the purest stage, by transferring at least some of said controlled quantity of mother liquor to the frozen crystals of the next less pure stage.

3. The method according to claim 2, wherein the mother liquor that is transferred to the frozen crystals of the next less pure stage has a purity greater than mother liquor remaining in the crystals to which said mother liquor is passed.

4. The method according to claim 1, wherein said crystal product has a purity of about 99.999 percent.

5. The method according to claim 1, wherein temperature conditions are substantially the same within each said stage.

6. The method according to claim 1, wherein the system includes between about two and about ten or more stages.

7. The method according to claim 1, wherein each controlled quantity of mother liquor and crystals that moves between stages is substantially the same irrespective of the stage from which or to which movement is effected.

8. The method according to claim 1, wherein flow rates of mother liquor between respective stages are substantially the same between each stage, and wherein flow rates of crystals between respective stages are substantially the same.

9. The method according to claim 1, wherein said step of separating the mother liquor from the frozen crystals is followed by transferring the crystals to a crystal receiver for metering a controlled quantity of crystals for transfer to the collector of the next purer stage and for passing residual crystals in the crystal receiver to the collector of the same stage.

10. The method according to claim 1, wherein said controlling of the reflux ratio includes maintaining steady state conditions within the system.

11. The method according to claim 10, wherein said maintaining of steady state conditions includes adding, removing and/or transferring the same quantities of crystallizable material feed crystals, mother liquor, byproduct, and product in each stage of the system and throughout each cycle thereof, and maintaining substantially the same temperature conditions in each stage and each cycle.

12. The method according to claim 1, wherein said controlling of the reflux ratio includes controlling of the product discharged from the system by regulating any two of crystallizable material feed introduced each cycle, byproduct discharged each cycle and product discharged each cycle.

13. The method according to claim 1, wherein said controlling of the reflux ratio procedure includes indirectly controlling the quantity of mother liquor transferred by metering recrystallizable crystal material that is transferred from each stage to the next purer stage.

14. The method according to claim 1, wherein said separating step is carried out in sequence firstly at said purest stage and lastly at said least pure stage.

15. The method according to claim 1, further including an impurity concentrating system having a plurality of concentration stages for further processing said byproduct from the least pure stage, said impurity concentrating system including a purest concentration stage and a least pure concentration stage; wherein feed into the impurity concentrating system is into said purest concentration stage, byproduct out of the impurity concentrating system is from said least pure concentration stage, and concentration product out of the impurity concentrating system is from said purest concentration stage; and wherein each said concentration stage freezes the crystallizable substance, separates into crystals and mother liquor, transfers a controlled quantity of mother liquor to a stage of next lesser purity, melts a portion of the frozen crystallizable substance and transfers crystals to a stage of next greater purity.

16. An apparatus for superpurifying crystallizable substances by a multistage recrystallization fractional freezing procedure, comprising:
 a plurality of stages at least including a least pure stage and a purest stage;
 means for collecting a crystallizable substance with mother liquor thereof to form a new solution within each collector means;
 processor means for lowering the temperature of the new solution of each stage to a freezing temperature at which the crystallizable substance crystallizes in order to form frozen crystals with mother liquor in each said stage;
 a mother liquor receiver of each said stage;
 means for separating said mother liquor from the frozen crystals and for transferring the separating mother liquor to said mother liquor receiver of each said stage;
 means for transferring a controlled quantity of mother liquor passed to the mother liquor receiver of the least pure stage and for thus providing a controlled quantity of byproduct;
 means for melting at least a portion of said frozen crystals to form a quantity of melted crystals;
 means for moving a controlled quantity of the melted crystals, except for those of the purest stage, to said collector of the next purer stage;
 means for collecting a controlled quantity of the melted crystals of the purest stage as a controlled quantity of superpurified crystal product;
 means for passing residual mother liquor from said mother liquor receiver of each stage to the collector of that same stage;
 means for adding a controlled quantity of crystallizable substance as feed to said collector of the least pure stage; and
 means for controlling the reflux ratio of the multistage fractional freezing apparatus.

17. The apparatus according to claim 16, further including means for wash transferring a controlled quantity of mother liquor from one stage to the frozen crystals of the next less pure stage.

18. The apparatus according to claim 17, wherein said wash transferring means includes a reflux receiver vessel separate from said mother liquor receiver.

19. The apparatus according to claim 16, further including means for maintaining substantially equal temperature conditions within each respective component of each said stage.

20. The apparatus according to claim 16, wherein the apparatus includes between two and about ten or more of said stages.

21. The apparatus according to claim 16, wherein said crystals moving means includes a crystal receiver vessel separate from said separating means.

22. The apparatus according to claim 16, wherein said means for controlling the reflux ratio includes means for maintaining steady state conditions within and between each stage of said system.

23. The apparatus according to claim 22, wherein said steady state condition maintaining means includes means for controlling said transferring means, said moving means and said collecting means, whereby each said means controls movement of substantially equal quantities of respective materials between each of said plurality of stages.

24. The apparatus according to claim 16, further including an impurity concentrating system having a plurality of concentration stages for further processing the byproduct from said least pure stage, said impurity concentrating system includes a purest concentration stage and a least pure concentration stage, feed input means for passing the byproduct of said least pure stage into said purest concentration stage, output means for removing by product from said least pure concentration stage, and product outflow means for removing concentration product from said purest concentration stage; and
 wherein each of said concentration stages includes means for freezing the byproduct of the least pure stage for recrystallizing same, means for separating same into frozen crystals and mother liquor, means for transferring a controlled quantity of mother liquor to a stage of next lesser purity, and means for transferring frozen crystals to a stage of next greater purity.

* * * * *

UNITED STATES PATENT AND TRADEMARK OFFICE
CERTIFICATE OF CORRECTION

PATENT NO. : 4,885,016

DATED : December 5, 1989

INVENTOR(S) : Kenneth F. Griffiths

It is certified that error appears in the above-identified patent and that said Letters Patent is hereby corrected as shown below:

Col. 2, lines 2-3, "a single stage crystallization systems" should read --single stage crystallization systems".

Col. 3, line 7, "a" should read --at--.

Col. 5, line 58, "lace" should read --place--.

Col. 8, line 48, "42c, 42d and 43d" should read --42c, 43c, 42d and 34d--.

Col. 10, line 57, "hich" should read --which--.

Col. 14, line 56, "whatever," should read --whatever--.

Signed and Sealed this

Twentieth Day of August, 1991

Attest:

HARRY F. MANBECK, JR.

*Attesting Officer*  *Commissioner of Patents and Trademarks*